(12) United States Patent
Takami

(10) Patent No.: US 8,466,912 B2
(45) Date of Patent: Jun. 18, 2013

(54) CONTENT DISPLAY DEVICE, CONTENT DISPLAY METHOD, CONTENT DISPLAY PROGRAM, RECORDING MEDIUM, SERVER APPARATUS, CONTENT PROVIDING METHOD AND CONTENT PROVIDING PROGRAM

(75) Inventor: Shinya Takami, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/502,931

(22) PCT Filed: May 19, 2011

(86) PCT No.: PCT/JP2011/061568
§ 371 (c)(1),
(2), (4) Date: Apr. 19, 2012

(87) PCT Pub. No.: WO2011/148858
PCT Pub. Date: Dec. 1, 2011

(65) Prior Publication Data
US 2012/0223934 A1   Sep. 6, 2012

(30) Foreign Application Priority Data
May 28, 2010   (JP) .................................. 2010-123560

(51) Int. Cl.
*G06T 15/40* (2011.01)
(52) U.S. Cl.
USPC ........................................ 345/418; 345/421
(58) Field of Classification Search
None
See application file for complete search history.

(56) References Cited

U.S. PATENT DOCUMENTS

| | | | | |
|---|---|---|---|---|
| 4,769,636 A | * | 9/1988 | Iwami et al. | 715/790 |
| 6,760,048 B1 | * | 7/2004 | Bates et al. | 715/797 |
| 2007/0106763 A1 | * | 5/2007 | Blumenau | 709/219 |

FOREIGN PATENT DOCUMENTS

| | | |
|---|---|---|
| CN | 86105001 A | 4/1987 |
| CN | 101512471 A | 8/2009 |
| JP | 08-286878 A | 11/1996 |
| JP | 2005-258879 A | 9/2005 |

OTHER PUBLICATIONS

Office Action dated Nov. 13, 2012 issued in the corresponding Canadian Patent Application No. 2,780,223.
Chinese Office Action dated Feb. 5, 2013, issued in counterpart Chinese Patent Application No. 201180005326.8.

* cited by examiner

*Primary Examiner* — Kee M Tung
*Assistant Examiner* — Sing-wai Wu
(74) *Attorney, Agent, or Firm* — Sughrue Mion, PLLC

(57) ABSTRACT

A content display device effectively displays content utilizing a visible area which is not hidden in a display area which is partially hidden, without changing the state of the display area. The content display device has: a determining means that determines whether or not one of display areas is partially hidden when the display areas arranged on a screen overlap each other; a specifying means that, when it is decided that one of the display areas is partially hidden, specifies a visible area included in the display area which is partially hidden; an acquiring means that acquires content comprising a feature portion of content positioned in the visible area at the time of display of the content in the display area which is partially hidden; and a display means that displays the acquired content in the display area which is partially hidden.

16 Claims, 9 Drawing Sheets

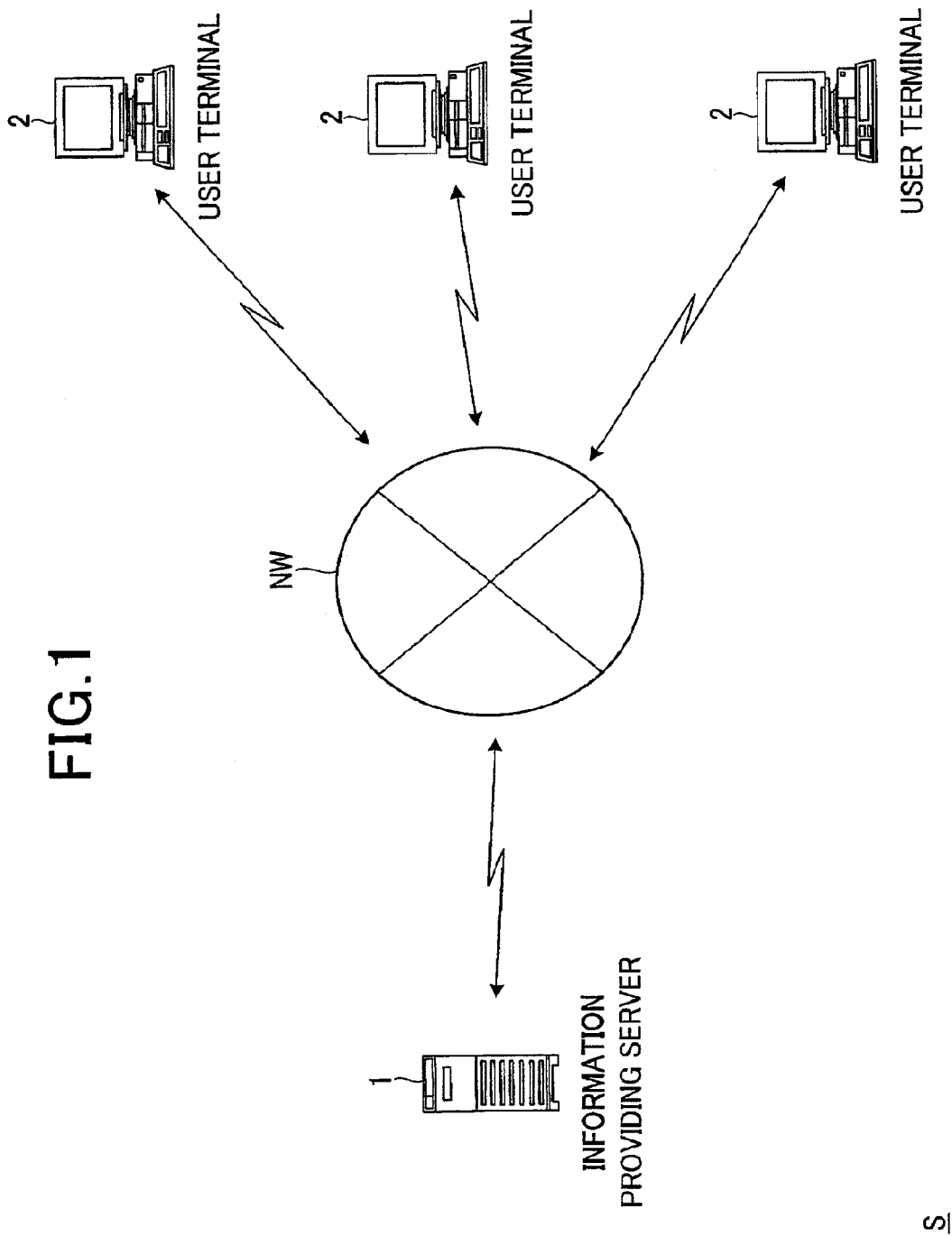

CONTENT DISPLAY DEVICE, CONTENT DISPLAY METHOD, CONTENT DISPLAY PROGRAM, RECORDING MEDIUM, SERVER APPARATUS, CONTENT PROVIDING METHOD AND CONTENT PROVIDING PROGRAM

CROSS REFERENCE TO RELATED APPLICATIONS

This application is a National Stage of International Application No. PCT/JP2011/061568 filed May 19, 2011, claiming priority based on Japanese Patent Application No. 2010-123560, filed May 28, 2010, the contents of all of which are incorporated herein by reference in their entirety.

TECHNICAL FIELD

The present invention relates to a technical field of a content display device which displays content in a display area in a system using a plurality of display areas.

BACKGROUND ART

Conventionally, a window system is known which enables an arrangement of a plurality of windows as display areas on a screen and displays a screen for each window. This window system allows the user to watch a plurality of contents simultaneously by arranging a plurality of windows on the screen.

When display positions of a plurality of windows overlap due to a user's window operation, only one of contents of windows is displayed in this overlapping range. Which window to display is determined based on the display priority of each window. The window having the highest priority is an active window. Further, the priority of each window changes according to the user's window operation. When a plurality of windows overlap, windows other than the window displayed in the overlapping range are completely hidden by other windows and are not displayed on the screen, or are partially hidden. In this case, a user's interest is mainly directed toward windows which are not hidden by the other windows, beginning with the active widow. Hence, even though content of the window is displayed in a range (hereinafter, referred to as "visible area") which is not hidden in a window which is partially hidden (which becomes partially invisible), the user's interest is not much directed toward content of this visible area. That is, there are cases where the visible area of the window which is partially hidden is an area which is meaningless for the user.

Patent Document 1 discloses a technique of changing a display size and display position of each window as a technique related to overlapping of windows. More specifically, when the user selects a plurality of objects displayed on the screen, a browsing device according to this technique initially arranges a window which displays content, in respective display positions of the selected objects. Then, in a range where the degree of overlapping of windows enables contents to be simultaneously browsed, the browsing device enlarges the display size of each window, and changes the display position of each window.

Prior Art Documents

Patent Document

Patent Document 1: Japanese Patent Application Laid-Open No. 2005-258879

SUMMARY OF THE INVENTION

Problems to be Solved by the Invention

However, the technique disclosed in Patent Document 1 causes annoyance that a state of windows such as display sizes, display positions and the degree of overlapping originally determined by the user's operation is changed due to circumstances irrespectively of the user's intension.

The present invention is made in light of the foregoing, and it is therefore an object of the present invention to provide a content display device, a content display method, a content display program, a recording medium, a server apparatus, a content providing method and a content providing program which can effectively display content utilizing a visible area which is not hidden in a display area which is partially hidden without changing a state of the display area.

Means for Solving the Problems

In order to solve the above problem, the invention according to claim 1 relates to a content display device comprising:

a determining means that determines whether or not one of display areas is partially hidden when the display areas arranged on a screen overlap each other;

a specifying means that, when it is decided that one of the display areas is partially hidden, specifies a visible area included in the display area that is partially hidden;

an acquiring means that acquires content comprising a feature portion of content positioned in the visible area at the time of display of the content in the display area that is partially hidden; and a display means that displays the acquired content in the display area that is partially hidden.

According to the present invention, the feature portion of content displayed in the display area which is partially hidden is positioned in the visible area, so that the feature portion is visible for the user. Consequently, the displayed content can attract the user's interest.

The invention according to claim 2 relates to the content display device according to claim 1, Wherein the acquiring means acquires content comprising the feature portion positioned in the visible area when a display size is fitted to a size of the display area that is partially hidden, and the display means fits the display size of the acquired content to the size of the display area that is partially hidden, for display.

According to the present invention, the display size of content is fitted to the display area which is partially hidden, so that it is possible to expand the range of content which is visible in the visible area. Consequently, it is possible to attract the user's interest more.

The invention according to claim 3 relates to the content display device according to claim 1 or claim 2, wherein the acquiring means acquires content comprising a maximum display area of the feature portion among contents comprising the feature portion positioned in the visible area.

According to the present invention, content having the feature portion which appears the largest is displayed in the visible area, so that it is possible to attract the user's interest more.

The invention according to claim 4 relates to the content display device according to one of claims 1 to 3, wherein the acquiring means acquires content related to display content in the display area that is active among contents comprising the feature portion positioned in the visible area.

According to the present invention, the feature portion of content related to display content in the active display area is visible, so that it is possible to attract the user's interest more.

The invention according to claim 5 relates to a content display method in a content display device that displays content, the content display method comprising:

a determining step of determining whether or not one of display areas is partially hidden when the display areas arranged on a screen overlap each other;

a specifying step of, when it is decided that one of the display areas is partially hidden, specifying a visible area included in the display area that is partially hidden;

an acquiring step of acquiring content comprising a feature portion of content positioned in the visible area at the time of display of the content in the display area that is partially hidden; and a display step of displaying the acquired content in the display area that is partially hidden.

The invention according to claim 6 relates to a content display program causing a computer provided in a content display device that displays content, to function as:

a determining means that determines whether or not one of display areas is partially hidden when the display areas arranged on a screen overlap each other;

a specifying means that, when it is decided that one of the display areas is partially hidden, specifies a visible area included in the display area that is partially hidden;

an acquiring means that acquires content comprising a feature portion of content positioned in the visible area at the time of display of the content in the display area that is partially hidden; and a display means that displays the acquired content in the display area that is partially hidden.

The invention according to claim 7 relates to a recording medium having a content display program computer-readably recorded thereon that causes a computer provided in a content display device that displays content, to function as:

a determining means that determines whether or not one of display areas is partially hidden when the display areas arranged on a screen overlap each other;

a specifying means that, when it is decided that one of the display areas is partially hidden, specifies a visible area included in the display area that is partially hidden;

an acquiring means that acquires content comprising a feature portion of content positioned in the visible area at the time of display of the content in the display area that is partially hidden; and a display means that displays the acquired content in the display area that is partially hidden.

The invention according to claim 8 relates to a server apparatus that a content display device that displays content can be connected to through a network, the server apparatus comprising:

a storage means that stores a plurality of contents and a plurality of pieces of feature information related to feature portions of the contents in an associated relationship;

a receiving means that receives visible area information transmitted from the content display device, as information related to a visible area included in a display area that is partially hidden when the display areas arranged on a screen overlap each other;

a selecting means that selects content comprising the feature portion positioned in the visible area at the time of display of the content in the display area that is partially hidden, among the stored contents based on the feature information and the visible area information; and a transmitting means that transmits the selected content to the content display device as content displayed in the display area that is partially hidden.

According to the present invention, the content display device which has received content from the server apparatus displays the received content in the display area which is partially hidden, and the feature portion of the content is positioned in the visible area, so that the feature portion of the content is visible for the user. Consequently, the displayed content can attract the user's interest.

The invention according to claim 9 relates to the server apparatus according to claim 8, Wherein the storage means stores the feature information indicating a range in which the feature portion occupies the content, the receiving means receives the visible area information indicating a range in which the visible area occupies the display area that is partially hidden, and the selecting means specifies a range in which the feature portion occupies the display area when a display size is fitted to a size of the display area that is partially hidden and the content is displayed, and selects content comprising the range included in the visible area.

According to the present invention, the content display device which has received content from the server apparatus fits the content to the display size and display the content in the display area which is partially hidden, so that the feature portion of the content is visible and it is possible to expand the range of content which is visible in the visible area. Consequently, it is possible to attract the user's interest more.

The invention according to claim 10 relates to the server apparatus according to claim 8 or claim 9, Wherein the storage means stores the feature information indicating a range in which the feature portion occupies the content, and the selecting means selects content comprising a maximum displaying area of the feature portion among contents comprising the feature portion positioned in the visible area, based on the feature information.

According to the present invention, content having the feature portion which appears the largest is displayed in the visible area, so that it is possible to attract the user's interest more.

The invention according to claim 11 relates to the server apparatus according to one of claim 8 to claim 10, Wherein the receiving means receives the visible area information and specifying information for specifying display content of the display area that is active, from the content display device, and the selecting means selects content related to the display content of the active display area among contents comprising the feature portion positioned in the visible area, based on the specifying information.

According to the present invention, the feature portion of content related to display content in the active display area is visible, so that it is possible to attract the user's interest more.

The invention according to claim 12 relates to a content providing method in a server apparatus that a content display device that displays content can be connected to through a network, the content providing method comprising:

a receiving step of receiving visible area information transmitted from the content display device, as information related to a visible area included in a display area that is partially hidden when the display areas arranged on a screen overlap each other;

a selecting step of selecting content comprising a feature portion positioned in the visible area at the time of display of the content in the display area that is partially hidden, among contents stored in a storage means that stores a plurality of contents and a plurality of pieces of feature information related to the feature portions of the contents in an associated relationship, based on the feature information and the visible area information; and a transmitting step of transmitting the selected content to the content display device as content displayed in the display area that is partially hidden.

The invention according to claim 13 relates to a content providing program causing a computer provided in a server apparatus that a content display device that displays content can be connected to through a network, to function as:

a receiving means that receives visible area information transmitted from the content display device, as information related to a visible area included in a display area that is partially hidden when the display areas arranged on a screen overlap each other;

a selecting means that selects content comprising a feature portion positioned in the visible area at the time of display of the content in the display area that is partially hidden, among contents stored in a storage means that stores a plurality of contents and a plurality of pieces of feature information related to the feature portions of the contents in an associated relationship, based on the feature information and the visible area information; and a transmitting means that transmits the selected content to the content display device as content displayed in the display area that is partially hidden.

The invention according to claim 14 relates to a recording medium having a content providing program computer-readably recorded thereon that causes a computer provided in a server apparatus that a content display device that displays content can be connected to through a network to function as:

a receiving means that receives visible area information transmitted from the content display device, as information related to a visible area included in a display area that is partially hidden when the display areas arranged on a screen overlap each other;

a selecting means that selects content comprising a feature portion positioned in the visible area at the time of display of the content in the display area that is partially hidden, among contents stored in a storage means that stores a plurality of contents and a plurality of pieces of feature information related to the feature portions of the contents in an associated relationship, based on the feature information and the visible area information; and a transmitting means that transmits the selected content to the content display device as content displayed in the display area that is partially hidden.

EFFECT OF THE INVENTION

According to the present invention, when the feature portion of content is positioned in the visible area, this feature portion is visible for the user, so that it is possible to display content which attracts the user's interest effectively utilizing a visible area without changing the state of the display area.

BRIEF DESCRIPTION OF THE DRAWINGS

FIG. 1 is a view illustrating an example of a schematic configuration of an information providing system S according to one embodiment.

BEST MODES FOR CARRYING OUT THE INVENTION

Hereinafter, the best embodiment of the present invention will be described with reference to the accompanying drawings. In addition, the embodiment which will be described below is an embodiment where the present invention is applied to an information providing system.

[1. Overview of Configuration and Function of Information Providing System]

First, the overview of the configuration and function of the information providing system S according to the present embodiment will be described using FIGS. 1 to 3.

FIG. 1 is a view illustrating an example of a schematic configuration of the information providing system S according to the present embodiment.

As illustrated in FIG. 1, the information providing system S is formed including an information providing server 1 and a plurality of user terminals 2. Further, the information providing server 1 and each user terminal 2 can transmit and receive data to and from each other through a network NW by applying, for example, TCP/IP as a communication protocol. In addition, the network NW is constructed with, for example, the Internet, a dedicated communication line (for example, CATV (Community Antenna Television) line), a mobile communication network (including, for example, a base station) and a gateway.

The information providing server 1 (an example of the server apparatus) is a Web server which is disposed to run information providing sites which provide, for example, various pieces of information and services. This information providing server 1 transmits content such as a Web page to the user terminal 2 according to a HTTP (Hyper Text Transfer Protocol) request from the user terminal 2.

In the user terminal 2 (an example of the content display device), a window system is mounted. The user terminal 2 displays a screen for each window arranged on the screen. Further, when activating the Web browser, the user terminal 2 displays content such as a Web page received from the information providing server 1, in the window of the Web browser. In addition, the window of the Web browser is referred to as a "browser window".

With the window system, when a plurality of windows arranged on the screen overlap, there are cases where one of windows is partially hidden by the other windows. That is, in the range in which windows overlap, contents of windows become invisible. At this point of time, the user terminal 2 displays content having the feature portion of content which fits to the visible area of the window which is partially hidden, in this window. The feature portion of content is, for example, a portion which well represents details of content, or a portion which attracts the user's interest and attention. Meanwhile, content having the feature portion which fits to the visible area is referred to as a "visible area fitting content".

Figure 2A:
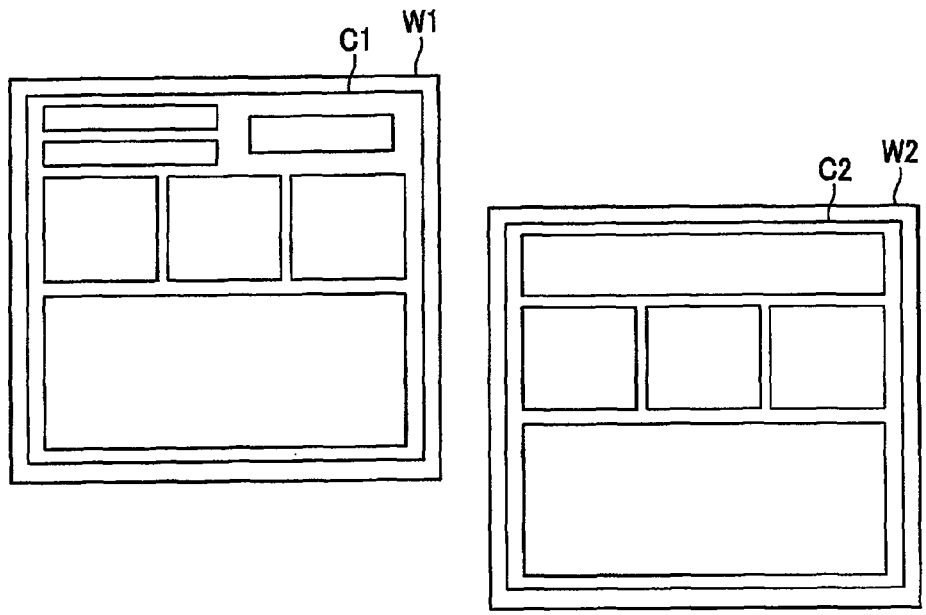
FIGS. 2A and 2B are views illustrating screen display examples according to one embodiment.
Figure 2B:
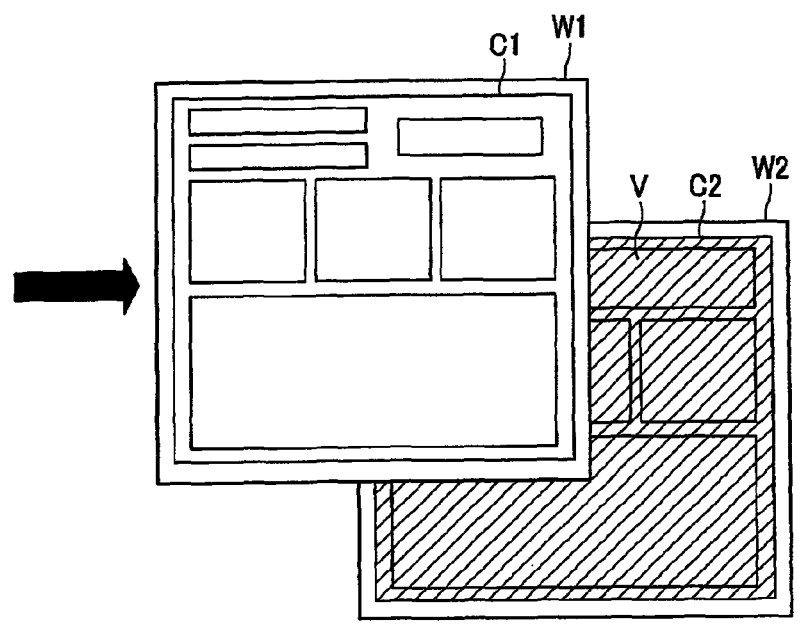
Figure 3A:
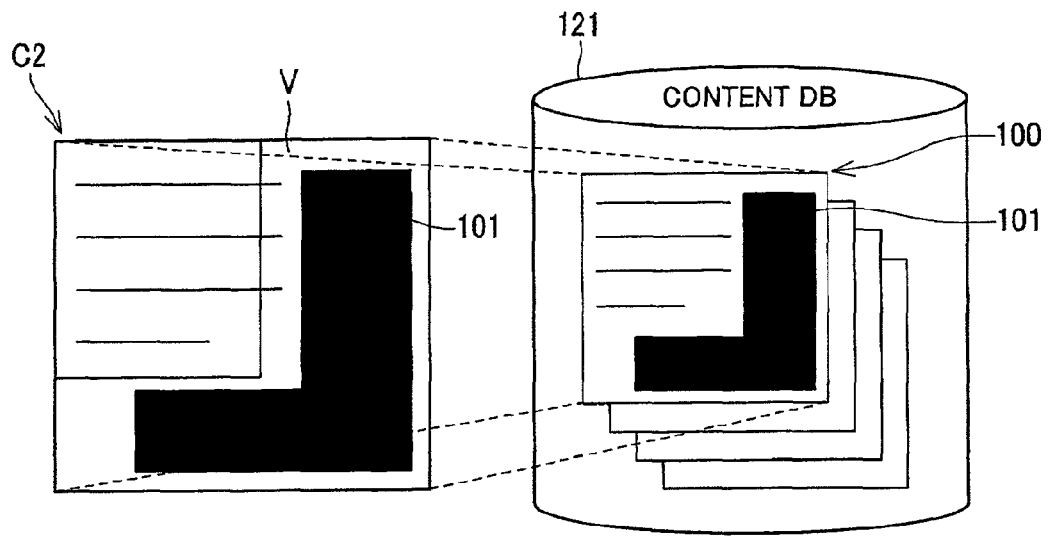
FIG. 3A is a view illustrating an extraction example of visible area fitting content according to one embodiment.
Figure 3B:
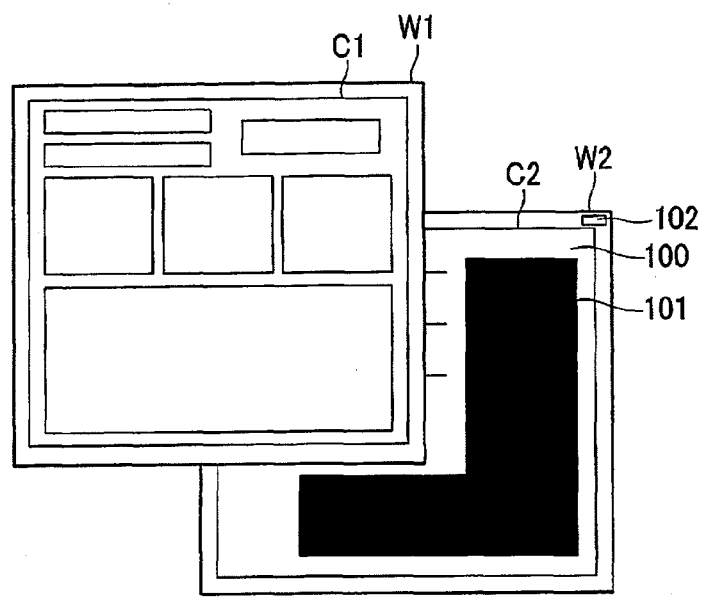
FIG. 3B is a view illustrating a screen display example.

FIGS. 2A, 2B and 3B are views illustrating screen display examples. Further, FIG. 3A is a view illustrating an extraction example of visible area fitting content. As illustrated in FIG. 2A, a window W1 and a window W2 are displayed on the screen of the user terminal 2 without overlapping each other. The window W1 includes a client area C1. Further, the window W2 includes a client area C2. The shapes of each window and client area have rectangular shapes. In addition, the area of the window area except the client area is a non-client area. The window W2 is a browser window. In the client area C2 of the window W2, a Web page is displayed. By contrast with this, the window W1 may be a browser window, or maybe a window of an application program other than the Web browser. In addition, the window and client area are examples of the display area according to the present invention.

Meanwhile, the user operates the window W1 to move the window W1. Further, as illustrated in FIG. 2B, the display position of the window W1 and display position of the window W2 partially overlap, thereby partially hiding the client area C2 of the window W2. The area which is filled with diagonal lines illustrated in FIG. 2B, that is, an area V of the client area C2 which is not hidden, is a visible area. At this point of time, the user terminal 2 transmits a content request to the information providing server 1 to acquire visible area fitting content which fits to the visible area V.

The information providing server 1 has a content DB (database) 121 illustrated in FIG. 3A. In the content DB 121, a plurality of contents are registered. Contents registered in the content DB 121 are, for example, image data. Meanwhile, the content may be, for example, data such as movie data, text data, Web page and electronic document or may be configured by mixing a plurality of types of data. Further, content (display content) indicated by a display image of content is, for example, an advertisement of a product or service, recommended information which recommends purchase of a product or service, or another notice. The display image of each content includes a feature portion. When receiving the content request, the information providing server 1 selects visible area fitting content from content registered in the content DB 121. More specifically, when the information providing server 1 fits the display size of content to the size of the client area C2 of the window W2 and displays the content in the client area C2, as illustrated in, for example, FIG. 3A, the information providing server 1 selects content 100 positioned to include a feature portion 101 in the visible area V as visible area fitting content. Further, the information providing server 1 transmits the content 100 to the user terminal 2.

When receiving the content 100, the user terminal 2 resizes (changes the size of) and fits the content 100 to the client area C2 to display in the client area C2. Then, as illustrated in FIG. 3B, in the visible area V of the client area C2, at least a feature portion 101 of the display image of the content 100 is displayed. Hence, the user has an interest in the content 100, so that display content of the visible area V becomes useful for the user. By this means, the visible area V is effectively utilized. Further, when the widow W1 moves, the window W1 becomes an active window. When the active window is the browser window, content related to content of a Web page displayed in the active window is displayed as the content 100. When content related to content of the active window is displayed in the visible area V, the content 100 attracts the user's interest more.

When the content 100 is displayed in the client area C2, a display button 102 is displayed in, for example, the non-client area of the window W2. When the user selects this display button 102, the window W2 is activated, and the entire content 100 is displayed on the screen. Thus, when the user has an interest in the content 100 and selects the display button 100, the user can watch the entire content 100. Further, a hyperlink is embedded in the content 100 displayed in the client area C2. When the user selects the hyperlink embedded in the content 100, a Web page related to display content of the content 100 is displayed in the client area C2. When, for example, the content 100 is content for an advertisement, a Web page which displays details of a product or service which is an advertisement target, a Web page for purchasing a product of an advertisement target or a Web page of an advertiser may be displayed. In this way, when the user who watches the entire content 100 has a more interest, it is possible to further acquire, for example, information related to display content of the content 100.

By contrast with this, the user selects the portion (including the visible area V) of the area of the window W2 which is not hidden except the display button 102. Then, the window W2 is activated, and display content before the content 100 is displayed, that is, a Web page displayed in the client area C2 illustrated in FIG. 2A, is redisplayed in the client area C2. Thus, even after the content 100 is displayed, the user can watch again the Web page which is displayed according to the user's intension.

[2. Configuration and Function of Information Providing Server]

Next, the configuration and function of the information providing server 1 will be described using FIGS. 4 and 5.

Figure 4:
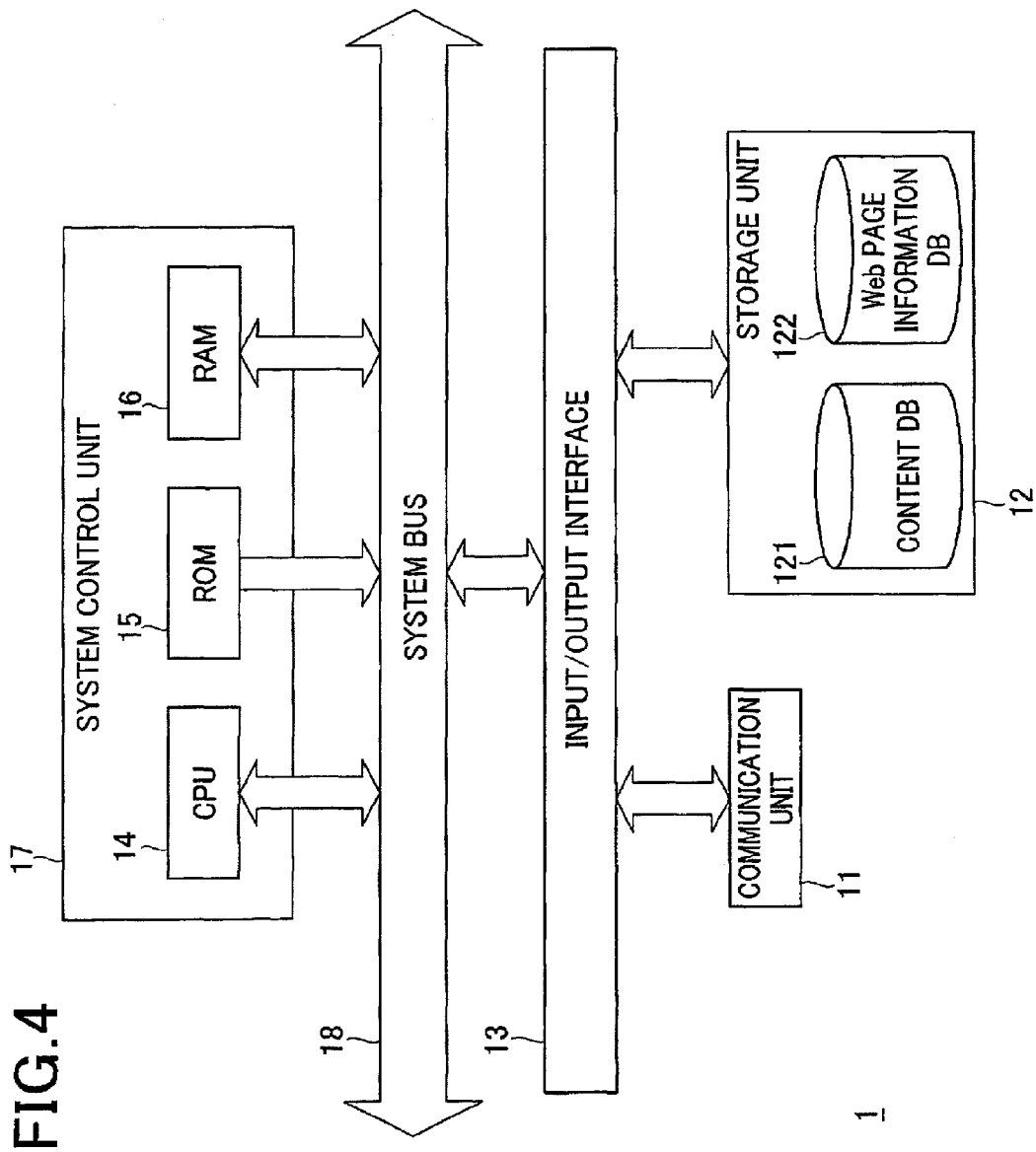
FIG. 4 is a block diagram illustrating an example of a schematic configuration of an information providing server 1 according to one embodiment.
Figure 5A:
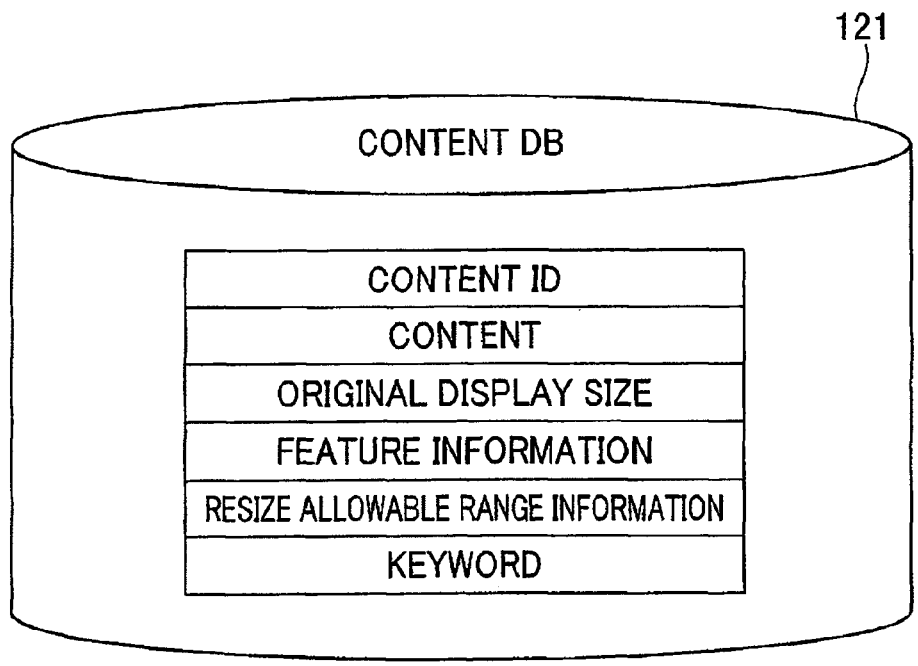
FIG. 5A is a view illustrating an example of content of information to be registered in a content DB 121.
Figure 5B:
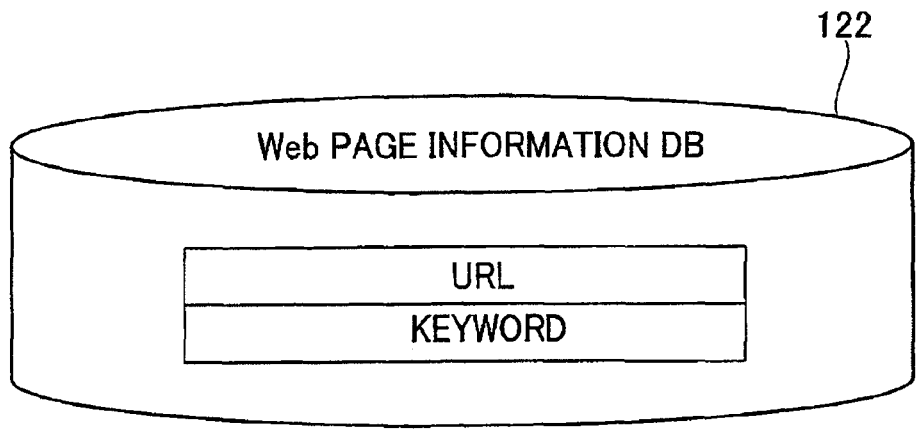
FIG. 5B is a view illustrating an example of content of information to be registered in a Web page information DB 122.

FIG. 4 is a block diagram illustrating an example of a schematic configuration of the information providing server 1 according to the present embodiment. Further, FIG. 5A is a view illustrating an example of content of information to be registered in the content DB 121. Furthermore, FIG. 5B is a view illustrating an example of content of information to be registered in the Web page information DB 122.

As illustrated in FIG. 4, the information providing server 1 has a communication unit 11, a storage unit 12, an input/output interface unit 13 and a system control unit 17. Further, the system control unit 17 and input/output interface unit 13 are connected through a system bus 18.

The communication unit 11 is connected to the network NW to control a communication state with, for example, the user terminal 2. The storage unit 12 (an example of a storage means) is formed with, for example, a hard disk drive, and stores various programs and data. In addition, the various programs may be acquired through the network from, for example, other server apparatuses, or may be recorded in a recording medium and read through a drive device. The input/output interface unit 13 performs interface processing between the communication unit 11 and storage unit 12, and the system control unit 17.

In the storage unit 12, the content DB 121 and Web page information DB 122 are constructed.

In the content DB 121, a plurality of contents which become candidates of the visible area fitting content are registered together with information related to content. As illustrated in FIG. 5A, in the content DB 121, a content ID, content, original display size, feature information, resize allowable range information, and keyword are registered per content. The content ID is identification information for identifying content. The portion of content registered in the content DB 121 is a feature portion. Further, content registered in the content DB 121 is, for example, content which can be displayed in the active window of the Web browser. At this point of time, the entire content is displayed on the screen. Further, content registered in the content DB 121 is not only entirely displayed, but also can be appropriated for visible area fitting content, of which the feature portion is displayed. The original display size is an original display size of content before the content is resized. The original display size indicates the numbers of longitudinal and lateral pixels of content. In addition, the original display size is actually set in a header area of content itself. The feature information is information which specifies the feature portion of content. When, for example, the area of the feature portion is represented as a polygonal area, the feature information includes, for example, the coordinate of each apex of the feature portion and information indicating the relationship of connection between each apex on each side of the feature portion. These coordinates indicate the position in content assuming the upper left end of content as the original point. In addition, the feature portion of content may be a point (one pixel) and, in this case, feature information includes the coordinate of this point. The feature information is information described according to, for example, XML. The original display size and feature information indicate the range that the feature portion occupies in the entire content registered in the content DB 121. The resize allowable range information indicates a resize allowable range when content is resized to fit to the client area. This resize allowable range information includes the lower limit value and upper limit value of the number of longitudinal pixels, and the lower limit value and upper limit value of the number of lateral pixels. This lower limit value is set to, for example, an extent that display content of content does not become hard to see due to reduced display of content. Further, the upper limit value is set to, for example, an extent that image quality of content does not become rough due to enlarged display of content. In addition, resize allowable range information may include only one of the lower limit value and upper limit value. The keyword is a term which indicates display content of content, or a term which relates to display content of content. One or more keywords are registered per content.

Various methods are adopted as a method of extracting the feature portion from content. For example, a method may be used which extracts a feature word by performing character recognition processing of content, and extracts as a feature portion a display range of content in which the feature word is extracted. Further, SIFT (registered trademark: Scale Invariant Feature Transform) or SURF (Speeded-Up Robust Features) may be used. Further, the hue, chroma, brightness and outline of an object may be extracted from content as an edge, and the feature portion may be extracted based on the degree of concentration of the edge in the content. Further, the feature portion may be extracted based on the degree of distinctiveness indicating the intensity which attracts a visual attention. In addition, these methods are known and therefore will not be described in detail. The information providing server 1 may extract the feature portion when, for example, content is registered in the content DB 121. Instead, an information processing device which is separate from the information providing server 1 may extract the feature portion in advance.

In the Web page information DB 122, information for displaying visible area fitting content related to content of a Web page displayed in the active window is registered. As illustrated in FIG. 5B, in the Web page information DB 122, a URL (an example of specifying information) of the Web page and a keyword are registered per Web page. The keyword is a term which indicates display content of the Web page, or a term which relates to display content of the Web page. One or more keywords are registered per Web page. The keyword can be extracted by performing, for example, morphological analysis of HTML document or XML document configuring a Web page. Further, when, for example, the Web page is a page which has information of a product, the name of a product, or the name or the category to which products belong may be a keyword. In addition, in the Web page information DB 122, only information related to the Web page of the information providing site may be registered, or information related to a Web page of a site other than the information providing site may also be registered.

Further, the storage unit 12 stores various items of data such as HTML document, XML document, image data, text data and electronic document configuring a Web page of an information providing site.

Furthermore, the storage unit 12 stores, for example, an operating system, a WWW (World Wide Web) server program, and a server program (an example of a content providing program) for transmitting visible area fitting content according to a content request from the user terminal 2. In addition, the above server program may be acquired through the network NW from, for example, other server apparatuses, or may be recorded in a recording medium such as a DVD (Digital Versatile Disc) and read through a drive device.

The system control unit 17 is formed with, for example, a CPU (Central Processing Unit) 14, ROM (Read Only Memory) 15 and RAM (Random Access Memory) 16. Further, the system control unit 17 reads and executes various programs stored in the CPU 14, ROM 15 and storage unit 12 to function as a receiving means, a selecting means and a transmitting means.

[3. Configuration, Function and the like of User Terminal]

Next, the configuration, function and the like of the user terminal 2 will be described using FIG. 6.

Figure 6:
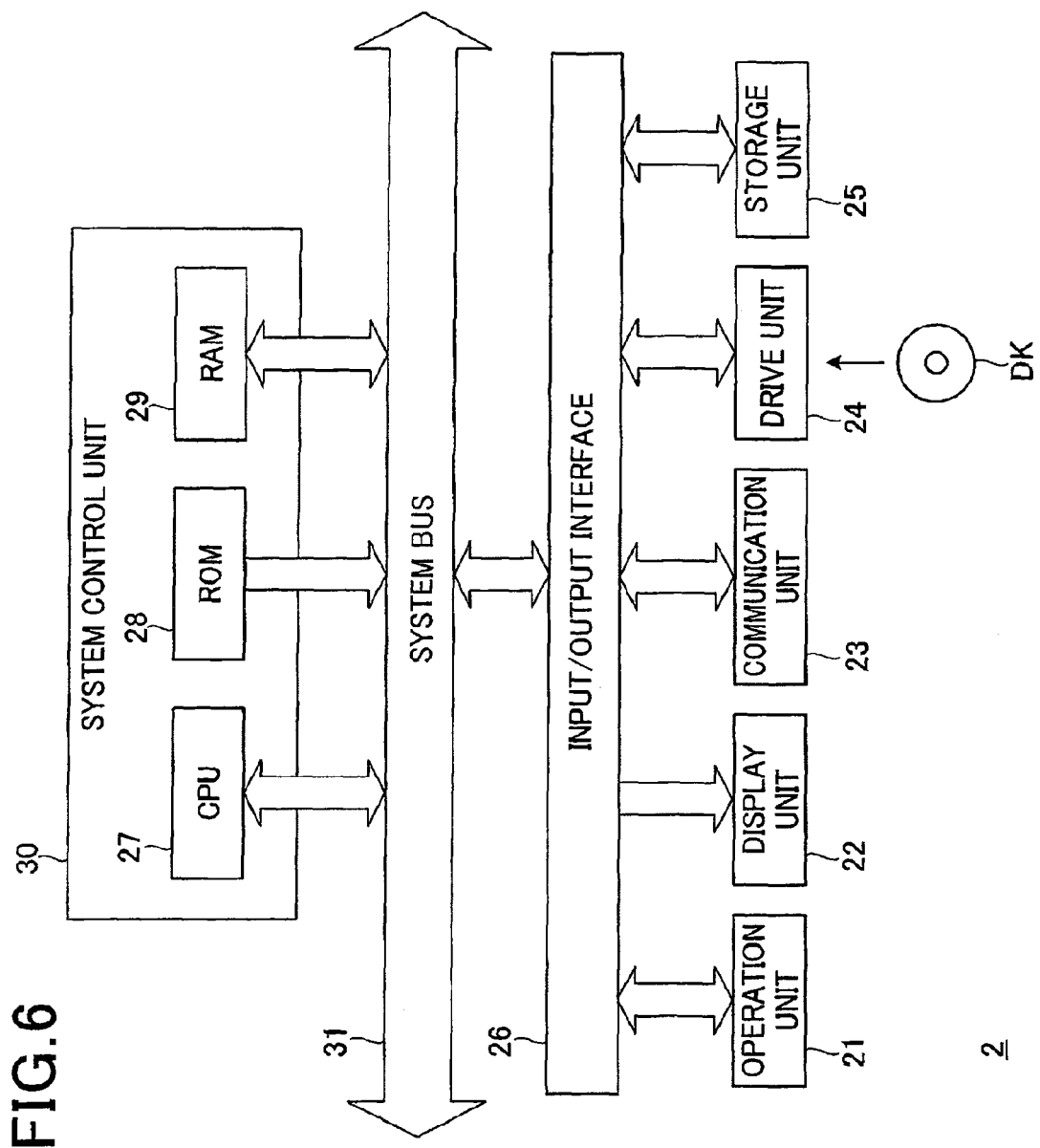
FIG. 6 is a block diagram illustrating an example of a schematic configuration of a user terminal 2 according to one embodiment.

FIG. 6 is a block diagram illustrating an example of a schematic configuration of the user terminal 2 according to the present embodiment.

As illustrated in FIG. 6, the user terminal 2 has an operation unit 21, a display unit 22, a communication unit 23, a drive unit 24, a storage unit 25, an input/output interface unit 26 and a system control unit 30. Further, the system control unit 30 and input/output interface unit 26 are connected through the system bus 31.

The operation unit 21 includes, for example, a keyboard and mouse, and receives an operation command from the user and outputs the command content to the system control unit 30 as a command signal. The display unit 22 is formed with, for example, a CRT (Cathode Ray Tube) display or liquid crystal display, and displays information such as texts and images. The communication unit 23 is connected to, for example, the network NW to control the communication state with, for example, the information providing server 1. The drive unit 24 reads, for example, data from a disk DK such as a DVD, and records, for example, data in this disk DK. The storage unit 25 is formed with, for example, a hard disk drive. The input/output interface unit 26 performs interface processing between the operation unit 21 to the storage unit 25, and the system control unit 30.

The storage unit 25 stores various application programs, beginning with the operating system (including the window system) and Web browser. The window system includes a window manager which is system software for managing windows. The Web browser includes a program for displaying visible area fitting content. This Web browser may be acquired through the network NW from, for example, the server apparatus such as the information providing server 1, or may be recorded in the disk DK and read through the drive unit 24.

The system control unit 30 is formed with, for example, a CPU 27, ROM 28 and RAM 29. Further, when the CPU 27 reads and executes various programs such as the Web browser, the system control unit 30 functions as a determining means, a specifying means, an acquiring means and a display means.

The control unit 30 which activates the Web browser acquires information of each window displayed on the screen to determine that windows overlap. The state of each window can change depending on an event which occurs in a window. The types of this event include, for example, opening a window (displaying a new window), closing a window (deleting a window), changing an active window, moving or resizing a window and selecting the display button. The system control unit 30 acquires information of a window every time this specific event occurs. In addition, a specific event related to a window is referred to as a "specific event". The specific event can be recognized by the system control unit 30 which is activating the Web browser in, for example, a mode where the specific event is notified from the window manager to the Web browser. Information delivered from the window manager when the specific event is notified includes, for example, the type of a specific event and a window identifier of a window in which the specific event occurs. The window identifier is unique information assigned by the window manager every time a new window is opened.

The pieces of information of a window which is an acquisition target is, for example, a window identifier, identification information of an application program to which a window is allocated, position information of a window, position information of the client area and display priority. These pieces of information can be acquired through, for example, an API (Application Program Interface) provided by the window system.

The identification information of the application program is, for example, a file name of an application program or a name of an application program. The position information of a window is, for example, a screen coordinate at the upper left end of the window (the coordinate indicating a position on a screen assuming the upper left end of the screen as the original point) and window size (the numbers of longitudinal and lateral pixels of the window). The position information of the client area is, for example, the screen coordinate at the upper left end of the client area and the size of the client area (the numbers of longitudinal and lateral pixels of the client area).

The display priority is a priority used to determine which window to display on the overlapping range when display positions of a plurality of windows overlap. A window having the highest display priority among a plurality of windows having the overlapping display positions is preferentially displayed in the overlapping range. The window of the first display priority is an active window. The active window is a target to input letters or operate by the user. By contrast with this, windows other than the active window are non-active windows. The display priority of each window is frequently changed by the user's operation.

When the API for acquiring the display priority of each window is not provided, the system control unit 30 decides the display priority of each window according to the notified type of the specific event. More specifically, when a window is opened, the opened window is activated. Hence, the system control unit 30 sets the first display priority for the opened window and decreases the display priority by one for the other windows displayed on the screen. When the Web browser is activated, one browser window is opened. Hence, the system control unit 30 sets the first display priority for the opened browser window. At this point of time, when a plurality of windows other than the browser window are opened, the Web browser cannot learn an accurate display priority of these windows. In this case, the system control unit 30 adequately allocates the second priority or less for these windows. When a window is closed, the system control unit 30 increases the display priority by one for the windows having a lower display priority than the closed window. When the active window is changed, the system control unit 30 sets the first display priority for an active window, and decreases the display priority by one for windows having a higher display priority than the display priority before this window is activated. When the window is moved or resized, the moved or resized window is activated, and therefore the same as in cases where the active window is changed applies. Further, the window in which the display button is selected also is activated. In addition, depending on the specification of the window system or specifications of individual application programs, how the display priority changes when the specific event occurs is sometimes different. In this case, the Web browser only needs to be configured such that the display priority is decided according to the respective specifications.

The system control unit 30 generates a window management table for managing information of the window, in the RAM 29. In this window management table, a window identifier, identification information of an application program, position information of a window, position information of the client area and display priority are set per window as window management information. For window management information of the window allocated to the Web browser, position information of the content display area and content display state information are set in addition to the above information. The position information of the visible area indicates the client coordinate of each apex of the polygonal area specified as the visible area (the coordinate indicating the position on the client area assuming the upper left end of the client area as the original point). The size of the client area and position information of the visible area indicate the range that the visible area occupies in the client area. The content display state information indicates whether or not visible area fitting content is displayed in the client area. When visible area fitting content is displayed, "display" is set to content display state information and, when visible area fitting content is not displayed, "non-display" is set to content display state information.

In addition, by, for example, transmitting a request to the information providing server 1 based on, for example, the user's operation, the system control unit 30 may receive arbitrary content registered in the content DB 121 from the information providing server 1 and display the received entire content in the active window.

[4. Operation of Information Providing System]

Next, the operation of the information providing system S will be described using FIGS. 7 to 9.

[4-1. Operation of User Terminal]

When the Web browser is activated by the user's operation, the system control unit 30 of the user terminal 2 opens one browser window. Further, the system control unit 30 acquires information of each window, and generates a window management table. At this point of time, the system control unit 30 sets the first display priority for the browser window.

Then, based on the user's operation, the system control unit 30 opens a new window or closes, moves or resizes existing windows. When opening the browser window, the system control unit 30 sets "non-display" to content display state information of the opened browser window. Further, when the user specifies a URL of a Web page, the system control unit 30 transmits a request of the Web page to a Web server such as the information providing server 1 and displays the Web page received from the Web server on a window which is the target of the Web browser.

Figure 7:
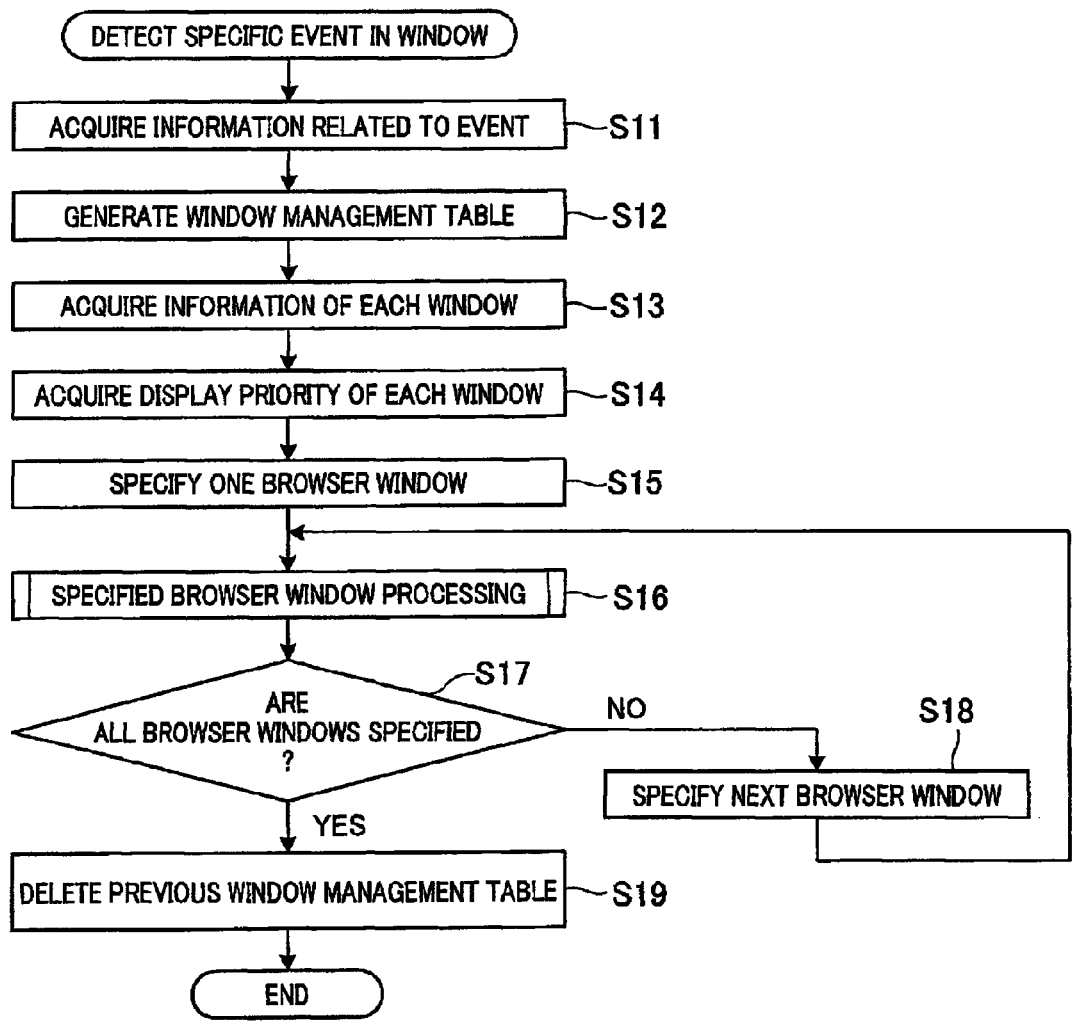
FIG. 7 is a flowchart illustrating a processing example in a system control unit 30 of the user terminal 2 according to one embodiment.

FIG. 7 is a flowchart illustrating a processing example in the system control unit 30 of the user terminal 2 according to the present embodiment. The processing illustrated in FIG. 7 is executed every time the specific event is notified to the Web browser in a state where the Web browser is activated.

First, when the specific event is notified, the system control unit 30 acquires the type of the specific event and a window identifier of a window in which the specific event has occurred (step S11). Next, the system control unit 30 generates a new window management table (step S12). This new window management table is referred to as a "new window management table", and the window management table generated when a previous specific event is notified is referred to as an "old window management table". In addition, when a current notice of the specific event is the first notice after the Web browser is activated, the window management table generated upon activation of the Web browser is the old window management table.

Next, the system control unit 30 acquires the window identifier of each window, identification information of an application program, position information of the window and position information of the client area, and sets these pieces of information to the new window management table (step S13).

Next, the system control unit 30 acquires the display priority of each window (step S14). More specifically, the system control unit 30 decides the display priority of each window at the current point of time, based on the type of the specific event and window identifier acquired in step S11, window identifier of each window set in the new window management table, window identifier of each window set in the old window management table and display priority. Next, the system control unit 30 sets the display priority of each window to the new window management table.

Next, the system control unit 30 specifies one browser window based on identification information of the application program set in the new window management table (step S15). Next, the system control unit 30 executes specified browser window processing which will be described below (step S16). With the specified browser window processing, when a specified browser window is partially hidden, visible area fitting content is displayed in this browser window.

Next, the system control unit 30 decides whether or not all browser windows are specified (step S17). At this point of time, the system control unit 30 specifies the next browser window (step S18) when there are browser window which are not specified (step S17: NO), and executes specified browser window processing (step S16). By contrast with this, the system control unit 30 deletes the old window management table from the RAM 29 (step S19) when all windows of the Web browser are specified (step S17: YES), and finishes processing illustrated in FIG. 7.

Figure 8:
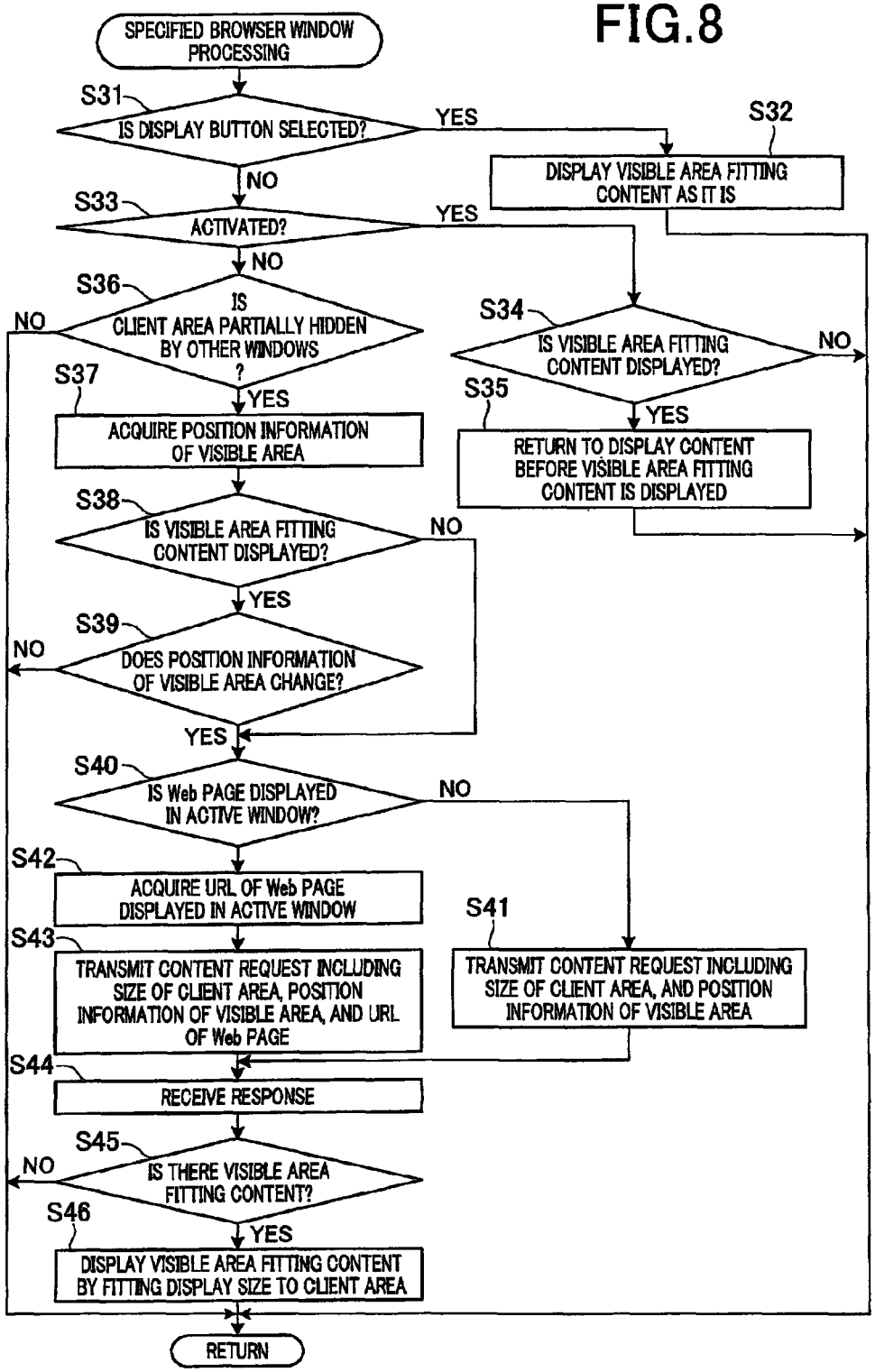
FIG. 8 is a flowchart illustrating a processing example of specified browser window processing in the system control unit 30 of the user terminal 2 according to one embodiment.

FIG. 8 is a flowchart illustrating a processing example of specified browser window processing in the system control unit 30 of the user terminal 2 according to the present embodiment.

First, the system control unit 30 determines whether or not the display button displayed in the specified browser window, based on the type of the specific event and window identifier acquired in step S11 (step S31). When the display button is displayed in the browser window, visible area fitting content is displayed in the client area of this browser window. Further, when the display button is selected, the system control unit 30 executes the window manager to activate the browser window which displays the display button. Then, the system control unit 30 displays visible area fitting content as is even after the specified browser window is activated (step S32) when the display button is selected (step S31: YES). Further, the system control unit 30 deletes the display button. Furthermore, the system control unit 30 sets "display" to the new window management table as content display state information of the specified browser window. Still further, the system control unit 30 finishes specified browser window processing.

In step S31, the system control unit 30 determines whether or not the specified browser window is activated (step S33) when the display button displayed in the specified browser window is not selected (step S31: NO). At this point of time, the system control unit 30 determines whether or not visible area fitting content is displayed in the client area of the specified browser window (step S34) when the specified browser window is activated (step S33: YES). More specifically, the system control unit 30 acquires content display state information of the specified browser window from the old window management table. Further, the system control unit 30 determines that visible area fitting content is displayed in the client area of the specified browser window when the acquired content display state information is "display" (step S34: YES). In this case, the system control unit 30 returns display content in the client area of the specified browser window to display content before visible area fitting content is displayed (step S35). For the method of returning the display content, for example, a browsing history function of the Web browser may be used. Further, the system control unit 30 deletes the display button. Further, the system control unit 30 sets "non-display" to the new window management table as content display state information of the specified browser window. Further, the system control unit 30 finishes specified browser window processing. By contrast with this, the system control unit 30 determines that visible area fitting content is not displayed in the client area of the specified browser window when the acquired content display state information is "non-display" (step S34: NO). In this case, the system control unit 30 sets "non-display" to the new window management table as content display state information of the specified browser window, and finishes specified browser window processing.

In step S33, the system control unit 30 functions as a determining means to determine whether or not the client area of the specified browser window is partially hidden by the other windows (step S36) when the specified browser window is not activated (step S33: NO). More specifically, the system control unit 30 acquires the display priority of the specified browser window from the new window management table. Next, the system control unit 30 extracts a window having a higher display priority than the display priority of the specified browser window, based on the display priority of each window set to the new window management table. Next, the system control unit 30 decides the degree of overlapping of the client area of the specified browser window and the other windows, based on position information of the extracted window and position information of the client area of the specified browser window. At this point of time, the system control unit 30 determines that the client area of the specified browser window is not partially hidden when the client area of the specified browser window is completely included in areas of the other windows or when the client area of the specified browser window does not completely overlap the areas of the other windows (step S36: NO). In this case, the system control unit 30 acquires content display state information of the specified browser window from the old window management table. Next, the system control unit 30 sets the acquired content display state information to the new window management table as current content display state information of the specified browser window. Further, the system control unit 30 finishes specified browser window processing.

By contrast with this, the system control unit 30 determines that the client area of the specified browser window is partially hidden when only part of the client area of the specified browser window overlaps the areas of the other windows (step S36: YES). In this case, the system control unit 30 functions as a specifying means to specify the visible area by acquiring position information in a range of the client area of the specified browser window which is not hidden (step S37). Further, the system control unit 30 sets position information of the acquired visible area to the new window management table.

Next, the system control unit 30 determines whether or not visible area fitting content is displayed in the client area of the specified browser window (step S38). The specific determining method is the same as in step S34. The system control unit 30 sets "non-display" to the new window management table as content display state information of the specified browser window when visible area fitting content is not displayed in the client area of the specified browser window (step S38: NO). Further, the system control unit 30 transitions to step S40.

By contrast with this, the system control unit 30 sets "display" to the new window management table as content display state information of the specified browser window when visible area fitting content is displayed in the client area of the specified browser window (step S38: YES). Next, the system control unit 30 determines whether or not position information of the visible area changes (step S39). More specifically, the system control unit 30 acquires position information of the respective visible areas from the new window management table and old window management table, and compares the acquired items of position information, respectively. Further, the system control unit 30 finishes specified browser window processing when position information of the visible area does not change (step S39: NO). By contrast with this, the system control unit 30 transitions to step S40 when position information of the visible area changes (step S39: YES).

In step S40, the system control unit 30 determines whether or not the Web page is displayed in the current active window. At this point of time, the system control unit 30 transmits a content request to the information providing server 1 (step S41) when the Web page is not displayed in the current active window (step S40: NO). At this point of time, the system control unit 30 sets the size of the client area of the specified browser window and position information of the visible area, to the content request.

By contrast with this, the system control unit 30 acquires a URL of the Web page displayed in the active window (step S42) and transmits the content request to the information providing server 1 (step S43) when the Web page is displayed in the current active window (step S40: YES). At this point of time, the system control unit 30 sets the size of the client area of the specified browser window, position information of the visible area and acquired URL, to the content request.

The system control unit 30 transmits the content request in step S41 or S43 and then functions as an acquiring means to receive a response from the information providing server 1 (step S44). Then, the system control unit 30 determines whether or not visible area fitting content is set to the received response (step S45). At this point of time, the system control unit 30 finishes specified browser window processing when visible area fitting content is not set to the received response (step S45: NO).

By contrast with this, the system control unit 30 functions as a display means to display visible area fitting content set to the response, in the client area of the specified browser window (step S46) when visible area fitting content is set to the received response (step S45: YES). More specifically, the system control unit 30 expands a bit map image showing a display image of visible area fitting content, on the RAM 29. Next, the system control unit 30 converts the bit map image such that the numbers of longitudinal and lateral pixels of the bit map image match with the numbers of longitudinal and lateral pixels of the client area. By this means, the display size of content matches with the size of the client area. Next, the system control unit 30 copies the converted bit map image to an image output buffer of the client area in the RAM 29. By this means, the system control unit 30 outputs the bit map image in the range of the visible area of the bit map image copied to the buffer, to the display unit 22. As a result, as illustrated in, for example, FIG. 3B, the feature portion of visible area fitting content is displayed on the screen. The system control unit 30 sets "display" to the new window management table as content display state information of the specified browser window when display of visible area fitting content is completed. Further, the system control unit 30 displays the display button in the specified browser window. Further, the system control unit 30 finishes specified browser window processing.

[4-2. Operation of Information Providing Server 1]

Figure 9:
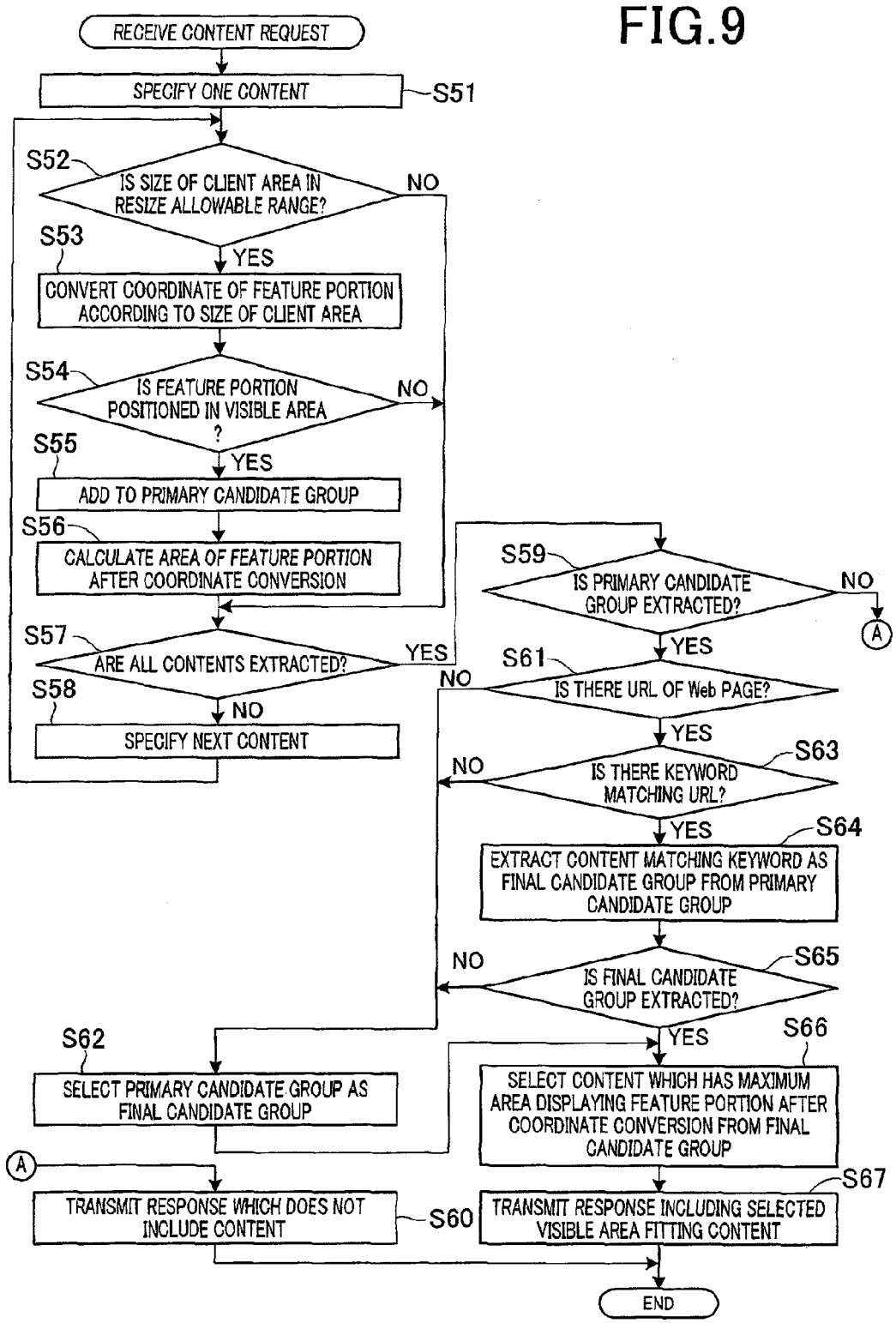
FIG. 9 is a flowchart illustrating a processing example of processing in a system control unit 17 of the information providing server 1 according to one embodiment.

FIG. 9 is a flowchart illustrating a processing example of processing in the system control unit 17 of the information providing server 1 according to the present embodiment. Processing illustrated in FIG. 9 is executed when the information providing server 1 receives a content request from the user terminal 2.

First, the system control unit 17 specifies one content from contents registered in the content DB 121 (step S51), and acquires information of specified content from the content DB 121. Next, the system control unit 17 determines whether or not the size of the client area is in the resize allowable range of the specified content (step S52). The number of longitudinal pixels and the number of lateral pixels indicating the size of the client area set in the content request which the system control unit received as a receiving means are hc and wc. Further, the lower limit value and upper limit value of the number of longitudinal pixels indicated by resize allowable range information of the specified content, and the lower limit value and upper limit value of the number of lateral pixels are h1 and h2, and w1 and w2, respectively. At this time, when $h1 \leq hc \leq h2$ and $w1 \leq wc \leq w2$ are satisfied, the system control unit 17 determines that the size of the client area is in the resize allowable range of the specified content (step S52: YES). In this case, the system control unit 17 transitions to step S53. By contrast with this, the system control unit 17 transitions to step S57 when it is determined that the size of the client area is not in the resize allowable range of the specified content (step S52: NO).

In step S53, the system control unit 17 converts the coordinate of each apex for specifying the feature portion indicated by feature information of the specified content to fit to the size of the client area. The coordinate of the apex before coordinate conversion is (x1, y1), and the coordinate of the apex of coordinate conversion is (x2, y2). Further, the number of longitudinal pixels and the number of lateral pixels indicated by the original display size of the specified content are ho and wo. In this case, the system control unit 17 calculates x2=(wc÷wo)×x1 and y2=(hc÷ho)×y1 for the coordinate of each apex.

Next, the system control unit 17 determines whether or not the feature portion after coordinate conversion is positioned in the visible area (step S54). More specifically, the system control unit 17 determines whether or not the range of the feature portion after coordinate conversion is included in the visible area, based on position information of the visible area set in the content request and feature information for which the coordinate is converted. In this case, the system control unit 17 determines that the feature portion after coordinate conversion is not positioned in the visible area when the range of the feature portion is not included in the visible area (step S54: NO). In this case, the system control unit 17 transitions to step S57.

By contrast with this, the system control unit 17 determines that the feature portion after coordinate conversion is positioned in the visible area when the range of the feature portion is included in the visible area (step S54: YES). In this case, the system control unit 17 functions as a selecting means to add the specified content to a primary candidate group as one of candidates of visible area fitting content (step S55). Next, the system control unit 17 calculates the area displaying the feature portion after coordinate conversion (step S56), and transitions to step S57.

In step S57, the system control unit 17 determines whether or not all contents registered in the content DB 121 are specified. At this point of time, the system control unit 17 specifies the next content from the contents registered in the content DB 121 (step S58) when there are contents which are not specified (step S57: NO), and acquires information of the specified content from the content DB 121. Further, the system control unit 17 transitions to step S52.

By contrast with this, the system control unit 17 determines whether or not one or more contents are extracted as the primary candidate group (step S59) when all contents registered in the content DB 121 are specified (step S57: YES). At this point of time, the system control unit 17 transmits a response which does not include content, to the user terminal 2 which has transmitted the content request (step S60) when no content is extracted (step S59: NO). Further, the system control unit 17 finishes processing illustrated in FIG. 9.

By contrast with this, the system control unit 17 determines whether or not a URL of a Web page is set in the content request (step S61) when one or more contents are extracted as the primary candidate group (step S59: YES). At this point of time, the system control unit 17 selects the primary candidate group as the final candidate group of visible area fitting content (step S62) when the URL of the Web page is not set in the content request (step S61: NO).

By contrast with this, the system control unit 17 determines whether or not the keyword matching the URL of the Web page is registered in the Web page information DB 122 (step S63) when the URL of the Web page is set in the content request (step S61: YES). At this point of time, the system control unit 17 selects the primary candidate group as the final candidate group of visible area fitting content (step S62) when the keyword matching the URL of the Web page is not registered (step S63: NO).

By contrast with this, the system control unit 17 functions as a selecting means to extract content having a keyword which is registered in the content DB 121 and which matches with the keyword matching the URL of the Web page, as the final candidate group from contents of the primary candidate group (step S64) when the keyword matching the URL of the Web page is registered (step S63: YES). Next, the system control unit 17 determines whether or not one or more contents are extracted as the final candidate group (step S65). At this point of time, the system control unit 17 selects the primary candidate group as the final candidate group of visible area fitting content (step S62) when no content is extracted (step S65: NO).

The system control unit 17 functions as a selecting means to select content having the maximum area displaying the feature portion after coordinate conversion among the contents of the final candidate group as visible area fitting content (step S66) when one or more contents are extracted as the final candidate group (step S65: YES) or when the primary candidate group is the final candidate group (step S62). Next, the system control unit 17 functions as a transmitting means to transmit a response in which the selected visible area fitting content is set, to the user terminal 2 which has transmitted the content request (step S67), and finishes processing illustrated in FIG. 9.

As described above, according to the present embodiment, the user terminal 2 specifies the visible area of the window which is partially hidden and transmits the content request in which position information of the visible area is set, to the information providing server 1 when the user terminal 2 determines whether or not one of windows is partially hidden when windows arranged on the screen overlap, and determines that one of windows is partially hidden. The information providing server 1 which has received the content request selects content having the feature portion positioned in the visible area when displayed in the window which is partially hidden, as visible area fitting content among the contents registered in the content DB 121, based on position information of the visible area included in the content request and feature information registered in the content DB 121, and transmits the visible area fitting content to the user terminal 2. The user terminal 2 which has received visible area fitting content displays the visible area fitting content in the window which is partially hidden. Consequently, the feature portion of content is positioned in the visible area, and therefore this feature portion is visible for the user, so that it is possible to display content which attracts the user's interest effectively utilizing the visible area, without changing the state of the display area.

Further, the user terminal 2 transmits to the information providing server 1 a content request in which the size of the client area of the window which is partially hidden and position information of the visible area are set, and the information providing server 1 selects as visible area fitting content the content having the feature portion positioned in the visible area when content is displayed by fitting the display size to the size of the client area of the window which is partially hidden, based on the size of the client area, position information of the visible area, feature information and the original display size of content. Further, the user terminal 2 fits the display size of the visible area fitting content received from the information providing server 1, to the size of the client area of the window which is partially hidden, and displays visible area fitting content. Consequently, it is possible to expand the range in which content is visible in the visible area.

Further, the information providing server 1 selects content having the maximum area displaying the feature portion among the contents having the feature portion positioned in the visible area, as visible area fitting content. Further, the user terminal 2 displays the visible area fitting content which is received from the information providing server 1 and which has the maximum feature area. Consequently, content having the feature portion which appears the largest is displayed in the visible area, so that it is possible to attract the user's interest more.

Further, the user terminal 2 transmits to the information providing server 1 a content request including a URL of a Web page displayed in the active window, and the information providing server 1 selects as visible area fitting content the content related to display content of the Web page displayed in the active window among contents having the feature portions positioned in the visible area, based on the URL included in the content request. Further, the user terminal 2 displays the visible area fitting content which is received from the information providing server 1 and which relates to display content of the active window. Consequently, the feature portion of content related to display content of the active window is visible, so that it is possible to attract the user's interest more.

Further, when the window which displays visible area fitting content is activated by a method except by selecting the display button, the user terminal 2 returns display content of this window to display content before the visible area fitting content is displayed. Consequently, it is possible to redisplay content displayed in the window before the visible area fitting content when the user needs the content.

Further, when detecting that the display button in the window which displays visible area fitting content is selected, the user terminal 2 activates this window and displays the entire visible area fitting content on the screen. Consequently, when the user has an interest in the visible area fitting content, it is possible to display the entire visible area fitting content.

Further, the information providing server 1 selects as visible area fitting content the content which has the size of the client area of the window which is partially hidden, in the resize allowable range, based on resize allowable range information registered in the content DB 121. Consequently, it is possible to prevent display content of content from being hard to see due to reduced display of content, and prevent image quality of content from being rough due to enlarged display of content.

In addition, with the above embodiment, the numbers of longitudinal and lateral pixels of content are set as resize allowable range information. However, one of the lower limit value and upper limit value of the magnification rate may be set as resize allowable range information. In this case, the information providing server 1 selects content having the magnification rate in case where content is resized to fit to the size of the client area in the range indicated by resize allowable range information. Further, in this case, resize allowable range information may not be registered in the database per content, and resize allowable range information which is common between all contents may be stored in the storage unit 12 of the information providing server 1.

Further, with the above embodiment, the display size of the visible area fitting content matches with the size of the client area. However, if the feature portion is positioned in the visible area, the display size of visible area fitting content may be smaller than the size of the client area more or less. In this case, the degree of the lower limit of the display size of visible area fitting content is that, for example, the visible area fitting content does not fully fit in the visible area and content is partially hidden by the other windows.

Further, as long as the size of the window and the size of the client area are fixed, and contents having display sizes matching with the size of the client area are registered in the content DB 121, the user terminal 2 may not resize visible area content when the visible area content is displayed. In this case, the user terminal 2 may not include the size of the client area in the content request when transmitting the content request. Further, the information providing server 1 extracts content having the feature portion positioned in the visible area, based on position information of the visible area included in the content request received from the user terminal 2 and feature information registered in the content DB 121.

Further, although, with the above embodiment, content having the size of the client area in the resize allowable range is selected as visible area fitting content, visible area fitting content may be configured to be selected irrespectively of the resize allowable range. Further, although, with the above embodiment, content having the maximum area displaying the feature portion among contents having feature portions positioned in the visible area is selected as visible area fitting content, visible area fitting content may be configured to be selected irrespectively of the area displaying the feature portion. Further, when a plurality of contents having feature portions positioned in the visible area are extracted, visible area fitting content may be selected at random from these contents.

Further, although, with the above embodiment, specifying information for specifying display content in the active window is applied to a URL of a Web page, specifying information may be applied to other information. When, for example, a Web page displayed in the active window shows a search result list of a product, a service, a Web page and the like, the keyword or search condition used for search may be used as specifying information to transmit this information from the user terminal 2 to the information providing server.

Further, when visible area fitting content is selected, the information providing server 1 may select visible area fitting content based on personal information of the user. By, for example, storing attribute information of the user such as the age, sex and residential area of the user in the storage unit 12 of the information providing server 1, visible area fitting content may be selected based on this attribute information. Further, by, for example, storing user's purchase history of a product or service at an information providing site or a predetermined Web site, in the storage unit 12 of the information providing server 1, content may be selected based on this purchase history. In this case, content such as an advertisement of a product of the same genre as products the user purchased or a relevant genre is selected. Further, by storing, for example, a user's browsing history of Web pages or use history of services, in the storage unit 12 of the information providing server 1, content may be selected based on, for example, this browsing history or use history. In all cases, it is possible to personalize visible area fitting content which is displayed on the user terminal 2. In addition, personal information of the user and the user who uses the user terminal 2 which has transmitted a content request can be associated by, for example, known log-in authentication.

Further, with the above embodiment, when the window is partially hidden, visible area fitting content is transmitted from the information providing server 1 to the user terminal 2. However, the information providing server 1 may transmit in advance a plurality of contents to the user terminal 2, and the user terminal 2 may store the content in the storage unit 25 in advance. Further, when the window is partially hidden, the user terminal 2 may acquire and display content which is visible area fitting content from contents stored in the storage unit 25.

Furthermore, although one server apparatus transmits Web pages and transmits content with the above embodiments, separate server apparatuses may perform respective processings.

Still further, although a Web browser displays visible area fitting content with the above embodiment, the window manager may display, for example, visible area fitting content. Further, although the window which is a target to display visible area fitting content is only a browser window, windows of all application programs may be targets. Furthermore, when the display area according to the present invention is also applied to a background area of the screen and the background area of the screen is partially hidden by a window, it may be possible to specify the visible area of the background area of the screen which is not hidden and display content having the feature portion positioned in the visible area, in the background area.

Further, with the above embodiment, only when the active window is the browser window, visible area fitting content related to display content of the active window is displayed. However, even when the active window is a window of an application program other than a Web browser, visible area fitting content related to display content of the active window may be displayed.

Description of Reference Numerals
1 INFORMATION PROVIDING SERVER
2 USER TERMINAL
11 COMMUNICATION UNIT
12 STORAGE UNIT
13 INPUT/OUTPUT INTERFACE UNIT
14 CPU
15 ROM
16 RAM
17 SYSTEM CONTROL UNIT
18 SYSTEM BUS
121 CONTENT DB
122 WEB PAGE INFORMATION DB
21 OPERATION UNIT
22 DISPLAY UNIT
23 COMMUNICATION UNIT
24 DRIVE UNIT
25 STORAGE UNIT
26 INPUT/OUTPUT INTERFACE UNIT
27 CPU
28 ROM
29 RAM
30 SYSTEM CONTROL UNIT
31 SYSTEM BUS
NW NETWORK
S INFORMATION PROVIDING SYSTEM

The invention claimed is:

1. A content display device comprising:
a determining unit that determines whether or not one of display areas is partially hidden when the display areas arranged on a screen overlap each other;
a specifying unit that, when it is decided that one of the display areas is partially hidden, specifies a visible area included in the display area that is partially hidden;
an acquiring unit that acquires content by finding content comprising a feature portion of content that fits inside the visible area at the time of display of the content in the display area that is partially hidden, from a content source; and
a display unit that displays the acquired content in the display area that is partially hidden.

2. The content display device according to claim 1, wherein the acquiring unit acquires content comprising the feature portion that fits inside the visible area when a display size is fitted to a size of the display area that is partially hidden, and
the display unit fits the display size of the acquired content to the size of the display area that is partially hidden, for display.

3. The content display device according to claim 1, wherein the acquiring unit acquires content comprising a maximum display area of the feature portion among contents comprising the feature portion that fits inside the visible area.

4. The content display device according to claim 1, wherein the acquiring unit acquires content related to display content in the display area that is active among contents comprising the feature portion that fits inside the visible area.

5. The content display device according to claim 1, wherein the acquiring unit acquires content by finding content comprising the feature portion that fits inside the visible area when a display size is fitted to a size of the display area that is partially hidden, and
the display unit fits the display size of the acquired content to the size of the display area that is partially hidden, for display, and
wherein the acquiring unit acquires content by finding content comprising a maximum display area of the feature portion among contents comprising the feature portion that fits inside the visible area.

6. The content display device according to claim 1, wherein the acquiring unit acquires content by finding, content comprising the feature portion that fits inside the visible area when a display size is fitted to a size of the display area that is partially hidden, and
the display unit fits the display size of the acquired content to the size of the display area that is partially hidden, for display, and
wherein the acquiring unit acquires content related to display content in the display area that is active among contents comprising the feature portion that fits inside the visible area.

7. A content display method in a content display device that displays content, the content display method comprising:
a determining step of determining whether or not one of display areas is partially hidden when the display areas arranged on a screen overlap each other;
a specifying step of, when it is decided that one of the display areas is partially hidden, specifying a visible area included in the display area that is partially hidden;
an acquiring step of acquiring content by finding content comprising a feature portion of content that fits inside the visible area at the time of display of the content in the display area that is partially hidden, from a content source; and
a display step of displaying the acquired content in the display area that is partially hidden.

8. A non-transitory recording medium having a content display program computer-readably recorded thereon that causes a computer provided in a content display device that displays content, to function as:
a determining unit that determines whether or not one of display areas is partially hidden when the display areas arranged on a screen overlap each other;
a specifying unit that, when it is decided that one of the display areas is partially hidden, specifies a visible area included in the display area that is partially hidden;
an acquiring unit that acquires content by finding content comprising a feature portion of content that fits inside the visible area at the time of display of the content in the display area that is partially hidden, from a content source; and a display unit that displays the acquired content in the display area that is partially hidden.

9. A server apparatus that a content display device that displays content can be connected to through a network, the server apparatus comprising:
- a storage unit that stores a plurality of contents and a plurality of pieces of feature information related to feature portions of the contents in an associated relationship;
- a receiving unit that receives visible area information transmitted from the content display device, as information related to a visible area included in a display area that is partially hidden when the display areas arranged on a screen overlap each other;
- a selecting unit that selects content by finding content comprising the feature portion that fits inside the visible area at the time of display of the content in the display area that is partially hidden, among the stored contents based on the feature information and the visible area information; and
- a transmitting unit that transmits the selected content to the content display device as content displayed in the display area that is partially hidden.

10. The server apparatus according to claim 9,
wherein the storage unit stores the feature information indicating a range in which the feature portion occupies the content,
the receiving unit receives the visible area information indicating a range in which the visible area occupies the display area that is partially hidden, and
the selecting unit specifies a range in which the feature portion occupies the display area when a display size is fitted to a size of the display area that is partially hidden and the content is displayed, and selects content comprising the range included in the visible area.

11. The server apparatus according to claim 9,
wherein the storage unit stores the feature information indicating a range in which the feature portion occupies the content, and
the selecting unit selects content comprising a maximum displaying area of the feature portion among contents comprising the feature portion that fits inside the visible area, based on the feature information.

12. The server apparatus according to claim 9,
wherein the receiving unit receives the visible area information and specifying information for specifying display content of the display area that is active, from the content display device, and
the selecting unit selects content related to the display content of the active display area among contents comprising the feature portion that fits inside the visible area, based on the specifying information.

13. The server apparatus according to claim 9,
wherein the storage unit stores the feature information indicating a range in which the feature portion occupies the content,
the receiving unit receives the visible area information indicating a range in which the visible area occupies the display area that is partially hidden, and
the selecting unit specifies a range in which the feature portion occupies the display area when a display size is fitted to a size of the display area that is partially hidden and the content is displayed, and selects content comprising the range included in the visible area, and
wherein the storage unit stores the feature information indicating a range in which the feature portion occupies the content, and the selecting unit selects content by finding content comprising a maximum displaying area of the feature portion among contents comprising the feature portion that fits inside the visible area, based on the feature information.

14. The server apparatus according to claim 9,
wherein the storage unit stores the feature information indicating a range in which the feature portion occupies the content,
the receiving unit receives the visible area information indicating a range in which the visible area occupies the display area that is partially hidden, and
the selecting unit specifies a range in which the feature portion occupies the display area when a display size is fitted to a size of the display area that is partially hidden and the content is displayed, and selects content comprising the range included in the visible area, and
wherein the receiving unit receives the visible area information and specifying information for specifying display content of the display area that is active, from the content display device, and
the selecting unit selects content related to the display content of the active display area among contents comprising the feature portion that fits inside the visible area, based on the specifying information.

15. A content providing method in a server apparatus that a content display device that displays content can be connected to through a network, the content providing method comprising:
- a receiving step of receiving visible area information transmitted from the content display device, as information related to a visible area included in a display area that is partially hidden when the display areas arranged on a screen overlap each other;
- a selecting step of selecting content by finding content comprising a feature portion that fits inside the visible area at the time of display of the content in the display area that is partially hidden, among contents stored in a storage unit that stores a plurality of contents and a plurality of pieces of feature information related to the feature portions of the contents in an associated relationship, based on the feature information and the visible area information; and
- a transmitting step of transmitting the selected content to the content display device as content displayed in the display area that is partially hidden.

16. A non-transitory recording medium having a content providing program computer-readably recorded thereon that causes a computer provided in a server apparatus that a content display device that displays content can be connected to through a network to function as:
- a receiving unit that receives visible area information transmitted from the content display device, as information related to a visible area included in a display area that is partially hidden when the display areas arranged on a screen overlap each other;
- a selecting unit that selects content by finding content comprising a feature portion that fits inside the visible area at the time of display of the content in the display area that is partially hidden, among contents stored in a storage unit that stores a plurality of contents and a plurality of pieces of feature information related to the feature portions of the contents in an associated relationship, based on the feature information and the visible area information; and a transmitting unit that transmits the selected content to the content display device as content displayed in the display area that is partially hidden.

\* \* \* \* \*